C. H. McCormick.

Mower.

No 817

Reissued Sep. 20, 1859.

C. H. McCormick.

Mower.

No. 817 Reissued Sep. 20, 1859.

UNITED STATES PATENT OFFICE.

CYRUS H. McCORMICK, OF CHICAGO, ILLINOIS.

IMPROVEMENT IN REAPING-MACHINES.

Specification forming part of Letters Patent No. 5,335, dated October 23, 1847; Reissue No. 239, dated May 24, 1853; Reissue No. 637, dated December 21, 1858; Reissue No. 817, dated September 20, 1859.

*To all whom it may concern:*

Be it known that I, CYRUS H. MCCORMICK, of Chicago, in the county of Cook and State of Illinois, have invented a new and useful Improvement in Reaping-Machines, of which the following is a full, clear, and exact description, reference being had to the accompanying drawings, making part of this specification, in which—

Figure 1:
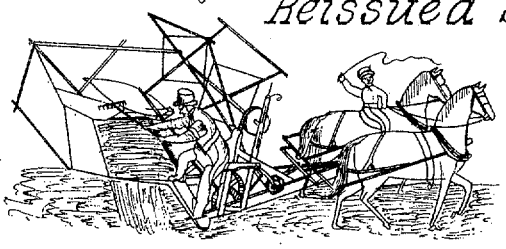
Figure 2:
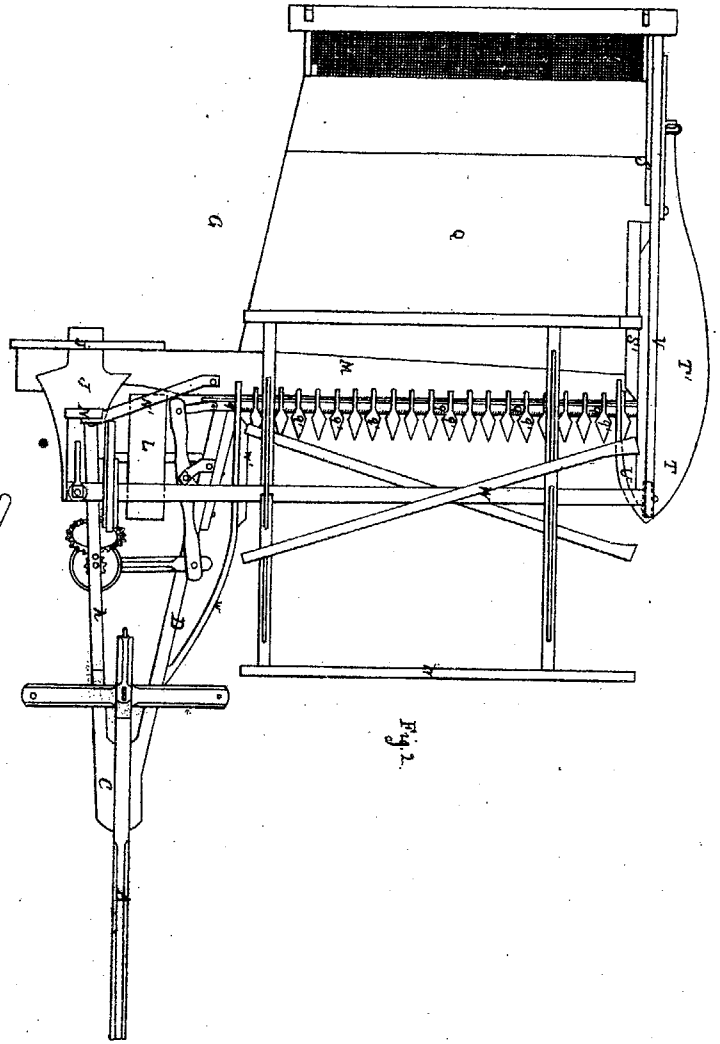
Figure 3:
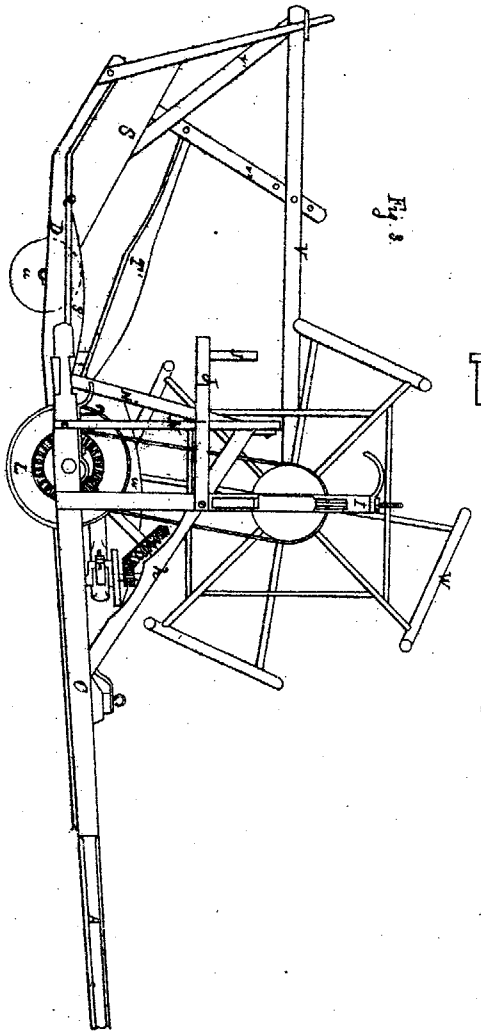
Figure 4:
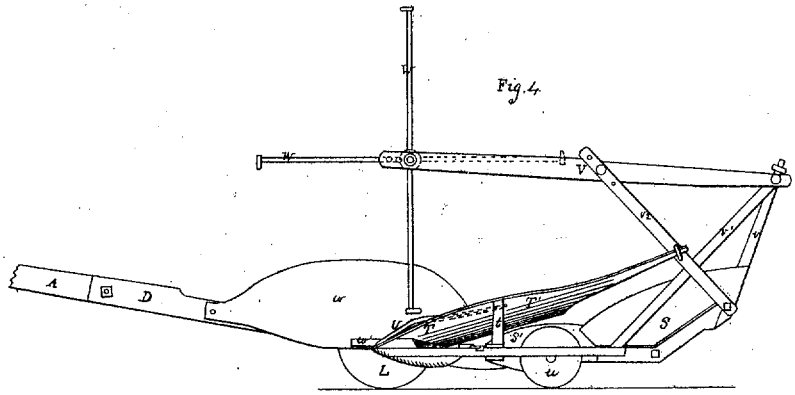
Figure 5:
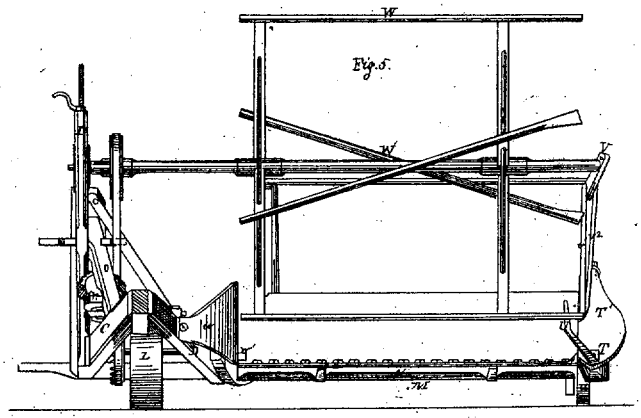
Figure 6:
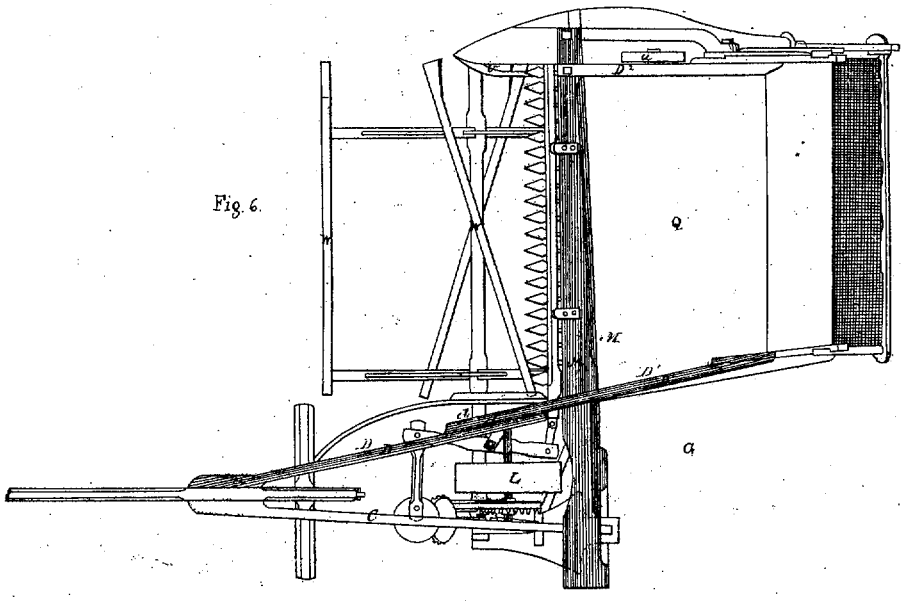

Figure 1 represents in perspective a side-draft-reel reaping-machine embracing my said improvement. Fig. 2 represents a plan of such a machine as seen from above. Fig. 3 represents an elevation of the inner side of the machine. Fig. 4 represents an elevation of the outer side of the machine. Fig. 5 represents an elevation of the front of the machine, and Fig. 6 represents a view of the under side of the machine.

That side of the machine to which the horses are attached and which runs next the stubble I call the "inner" side, and the opposite side of the machine, which runs next the uncut grain, I call the "outer" side, of the machine.

It is the object of my invention to combine in one reaping-machine a side draft, side gearing, a reel, a raker's seat or stand, and the delivery of the grain at the side of the swath, so as to be substantially out of the path of the horses when coming round with the machine to cut the next swath.

This improvement embraces the combination of the following elements: first, a tongue, or its equivalent to draw by projecting in front of and at one side of the frame; second, a driving-wheel and driving-gearing arranged at the same side of the frame as the tongue; third, a reel to gather the grain and bear it back to the cutter and, when cut, upon the platform; fourth, a raker's seat or stand fixed upon the machine itself, so located that the raker who occupies it can conveniently sweep the cut grain off the platform and lay it on the ground at the side of the swath on or near the track of and substantially behind the horses; fifth, a short platform or one which will at the same time receive the grain as it is cut and carry it in a convenient position for being discharged by the raker, and without obstructing the deposit of the gavel on the ground substantially behind the horses.

In the drawings I have shown this improvement applied to a McCormick reaping-machine, but deem it unnecessary to describe in detail any more of that machine than is needful to a proper understanding of this improvement.

In the accompanying drawings, M represents a strong beam, called the "finger-piece" or "finger-beam," forming the front part of the platform Q, on the front of the outer portion of which the cutting apparatus is placed. The finger-beam is attached at the inner end to the rear ends of two oblique beams or hounds, C and D, which converge as they extend forward until they meet the rear end of a tongue, A, to which they are connected.

A driving-wheel, L, and gearing for giving motion to the cutter and the reel are arranged in the space between the hounds, as represented in the drawings. The raker is placed on a seat or stand, J, fixed on the frame behind the axis of the reel W. From this seat, as represented in Fig. 1 of the drawings, the raker can conveniently reach the grain upon the platform, sweep it off at intervals, and lay it on the ground in gavels with the stalks across the line of the swath and out of the path of the horses when they return with the machine to cut the next swath.

The platform Q may be made of any of the materials in common use for that purpose. It is supported at the inner side by an extension, D′, of the hound D across the finger-beam M, and at the outer side by a beam, $D^2$, Fig. 6, secured and braced to the corresponding end of the finger-beam and extending backward therefrom. To this outer beam is pivoted a small wheel, *u*, which I term the "grain-wheel," being nearest the standing grain and supporting that side of the machine.

The length of the platform Q at its front side is not quite equal to that of the cutter, and at its rear side it is made still shorter by slanting its inner side from the finger-beam toward the outer side. The grain is discharged in the track of the horses and out of their path when returning with the machine to cut the next swath, and the discharge is effected by moving the cut grain a less distance and with less labor than would be necessary if a longer platform were used. At the outer side of this platform there is a grain-guard, S S′, to prevent the cut grain from dropping out on that side, and at the back there is a cloth screen to prevent its dropping out at the rear.

The reel is supported at the outer end by an arm, V, and at the inner end by a standard or post, I. Motion is communicated to the reel from the driving-gear by a belt which encircles a pulley on the axle of the driving-wheel and a pulley on the shaft of the reel. The reel is placed at such an elevation that its under ribs or bars dip down among the stalks of grain to be cut in front of the cutter, and the direction of its rotation is such that its lower ribs as the machine advances are continually sweeping backward to press the grain back against the cutter, and when cut to bear it upon the platform. If the grain thus gathered upon the platform by the aid of the reel was not removed before the quantity gathered had piled up high enough to meet the reel-ribs in their rotation, the reel would then clog and stop; and even when the accumulation is not so great as to clog the reel it will obstruct more or less the falling of the cut grain upon the platform, and render it liable to slide forward into the cutting apparatus to be recut or chopped up and wasted, or else to obstruct or clog the cutter and stop the machine. Hence it is indispensable that a rake should be worked in co-operation with the reel so as to remove the cut grain with regularity and frequency to prevent an undue accumulation upon the platform and insure a proper and continued working of the machine.

What I claim under this patent as my invention is—

The combination of a tongue or its equivalent to draw the machine by, a driving-wheel and gearing arranged at the side of the frame, a short platform, a reel to gather the grain to the platform, and a stand or seat for the raker fixed upon the machine, so as to enable the raker conveniently to discharge the grain and lay it in gavels upon the ground at the side of of the swath and out of the return-path of the horses, substantially as described.

In witness whereof I have hereunto signed my name.

C. H. McCORMICK.

In presence of—
P. H. WATSON,
JOHN S. HOLLINGSHEAD.